United States Patent
Ohara et al.

(10) Patent No.: US 11,976,149 B2
(45) Date of Patent: May 7, 2024

(54) CURABLE COMPOSITION FOR OPTICAL MATERIALS, AND OPTICAL MATERIAL

(71) Applicant: TOKUYAMA CORPORATION, Shunan (JP)

(72) Inventors: Ayako Ohara, Tsukuba (JP); Taichi Hanasaki, Tsukuba (JP); Junji Takenaka, Tsukuba (JP); Junji Momoda, Tsukuba (JP)

(73) Assignee: TOKUYAMA CORPORATION, Shunan (JP)

( * ) Notice: Subject to any disclaimer, the term of this patent is extended or adjusted under 35 U.S.C. 154(b) by 359 days.

(21) Appl. No.: 17/413,754

(22) PCT Filed: Dec. 17, 2019

(86) PCT No.: PCT/JP2019/049277
§ 371 (c)(1),
(2) Date: Jun. 14, 2021

(87) PCT Pub. No.: WO2020/129931
PCT Pub. Date: Jun. 25, 2020

(65) Prior Publication Data
US 2022/0049037 A1    Feb. 17, 2022

(30) Foreign Application Priority Data

Dec. 17, 2018 (JP) ................ 2018-235551
Dec. 18, 2018 (JP) ................ 2018-236343
Dec. 18, 2018 (JP) ................ 2018-236344

(51) Int. Cl.
| | |
|---|---|
| G02B 1/111 | (2015.01) |
| C08F 2/50 | (2006.01) |
| C08F 20/14 | (2006.01) |
| C08F 222/10 | (2006.01) |
| C08F 290/14 | (2006.01) |
| C08K 5/3475 | (2006.01) |
| C08L 75/06 | (2006.01) |
| G02B 1/04 | (2006.01) |

(52) U.S. Cl.
CPC .......... *C08F 222/1063* (2020.02); *C08F 2/50* (2013.01); *C08F 20/14* (2013.01); *C08F 290/142* (2013.01); *C08K 5/3475* (2013.01); *C08L 75/06* (2013.01); *G02B 1/111* (2013.01); *C08F 2800/20* (2013.01); *G02B 1/041* (2013.01)

(58) Field of Classification Search
None
See application file for complete search history.

(56) References Cited

U.S. PATENT DOCUMENTS

| | | |
|---|---|---|
| 3,493,539 A | 2/1970 | Fertig et al. |
| 6,365,223 B1 | 4/2002 | Yoshimura et al. |
| 2002/0028918 A1 | 3/2002 | Kasada et al. |
| 2005/0113478 A1* | 5/2005 | Suzuki ................ C08K 5/0041 522/71 |
| 2010/0238540 A1 | 9/2010 | Miyakawa |
| 2016/0223839 A1* | 8/2016 | Kakinuma ............ G02C 7/108 |
| 2017/0153464 A1* | 6/2017 | Tamura ................ B32B 27/365 |
| 2018/0016415 A1 | 1/2018 | Kakinuma et al. |
| 2018/0273673 A1 | 9/2018 | Kageyama et al. |
| 2018/0340044 A1 | 11/2018 | Kakinuma et al. |
| 2020/0270421 A1 | 8/2020 | Namiki et al. |

FOREIGN PATENT DOCUMENTS

| | | |
|---|---|---|
| CN | 108026277 A | 5/2018 |
| CN | 108473643 A | 8/2018 |
| EP | 3 640 686 A1 | 4/2020 |
| JP | H06-128503 A | 5/1994 |
| JP | 2001-235601 A | 8/2001 |
| JP | 3223460 B2 | 10/2001 |
| JP | 2008-134618 A | 6/2008 |
| JP | 2011-145341 A | 7/2011 |
| JP | 2011-237730 A | 11/2011 |
| JP | 4813900 B2 | 11/2011 |
| JP | 2012-41333 A | 3/2012 |
| JP | 2012-173704 A | 9/2012 |
| JP | 2012-219169 A | 11/2012 |
| JP | 2016-125049 A | 7/2016 |
| JP | 2016-166138 A1 | 9/2016 |
| JP | 2017-19903 A | 1/2017 |

(Continued)

OTHER PUBLICATIONS

Chinese Office Action and Search Report for Chinese Application No. 201980082234.6, dated Aug. 23, 2022.
Chinese Notice of Allowance and Search Report for corresponding Chinese Application No. 201980082160.6, dated Mar. 16, 2022.
Chinese Office Action and Search Report for Chinese Application No. 201980082234.6, dated Mar. 16, 2022.

(Continued)

*Primary Examiner* — Sheeba Ahmed
(74) *Attorney, Agent, or Firm* — Birch, Stewart, Kolasch & Birch, LLP

(57) ABSTRACT

The present invention relates to a curable composition for an optical material, containing (A) 100 parts by mass of a radical polymerizable monomer, (B) 0.005 to 0.5 parts by mass of a tetraazaporphyrin compound having a maximum absorption wavelength in a range of 560 nm or more and 620 nm or less, and (C) 0.1 to 10 parts by mass of an ultraviolet absorber having a maximum absorption wavelength in a range of 330 nm or more and 350 nm or less. According to the present invention, it is possible to provide a curable composition for an optical material, capable of being suitably used as a coating material that can easily provide an optical material having good antiglare properties and excellent weather resistance.

8 Claims, No Drawings

(56) References Cited

FOREIGN PATENT DOCUMENTS

| | | |
|---|---|---|
| JP | 2017-31230 A | 2/2017 |
| JP | 2018-16778 A | 2/2018 |
| JP | 2018/087262 A | 6/2018 |
| JP | 2018-97173 A | 6/2018 |
| JP | 2018-197833 A | 12/2018 |
| JP | 7151726 B2 | 10/2022 |
| TW | 201437670 A | 10/2014 |
| WO | WO 2009/038134 A1 | 3/2009 |
| WO | WO 2014/155787 A1 | 10/2014 |
| WO | WO 2015/037628 A1 | 3/2015 |
| WO | WO 2017/182639 A1 | 10/2017 |

OTHER PUBLICATIONS

Chinese Office Action for Chinese Application No. 201980082137.7, dated Oct. 10, 2022.
Extended European Search Report for European Application No. 19898115.1, dated Sep. 16, 2022.
Extended European Search Report for European Application No. 19899636.5, dated Sep. 16, 2022.
International Search Report, issued in PCT/JP2019/049276, PCT/ISA/210, dated Mar. 24, 2020.
International Search Report, issued in PCT/JP2019/049277, PCT/ISA/210, dated Mar. 10, 2020.
International Search Report, issued in PCT/JP2019/049279, PCT/ISA/210, dated Mar. 10, 2020.
Written Opinion of the International Searching Authority, issued in PCT/JP2019/049276, PCT/ISA/237, dated Mar. 24, 2020.
Written Opinion of the International Searching Authority, issued in PCT/JP2019/049277, PCT/ISA/237, dated Mar. 10, 2020.
Written Opinion of the International Searching Authority, issued in PCT/JP2019/049279, PCT/ISA/237, dated Mar. 10, 2020.
Japanese Notice of Allowance for corresponding Japanese Application No. 2020-561431, dated Jan. 17, 2023.
Japanese Office Action for corresponding Japanese Application No. 2020-561430, dated Jul. 4, 2023.
U.S. Office Action for U.S. Appl. No. 17/413,667, dated Jan. 22, 2024.
U.S. Office Action for U.S. Appl. No. 17/413,841, dated Jan. 17, 2024.

* cited by examiner

CURABLE COMPOSITION FOR OPTICAL MATERIALS, AND OPTICAL MATERIAL

TECHNICAL FIELD

The present invention relates to a curable composition for an optical material containing a tetraazaporphyrin, and a cured body obtained by curing the composition. More specifically, the present invention relates to a curable composition for an optical material which can be suitably used as a material capable of easily providing an optical material having antiglare performance by coating and curing the composition on the surface of an optical substrate such as a spectacle lens.

BACKGROUND ART

In recent years, it has been desired to impart an antiglare function to an optical substrate such as a spectacle lens in order to clarify the contour and color of an object and reduce glare to visible light and visual fatigue. As a means for this purpose, it is possible to selectively shield as much as possible a wavelength that is likely to cause glare. For example, a neodymium compound can absorb visible light in the vicinity of 585 nm with highly selectively, and a spectacle lens containing a neodymium compound is known to improve the contrast of visually recognized objects. In addition, a tetraazaporphyrin compound can impart excellent antiglare performance and improvement in contrast to a spectacle lens, similarly to the neodymium compound. In other words, because of the sharpness of the peak at the specific absorption wavelength, the optical transparency is good in the region other than the vicinity of 585 nm, and a bright field can be secured, so that it is possible to provide a spectacle lens having an extremely good balance between the antiglare properties and the visibility (contrast).

PTL 1 discloses a method in which a tetraazaporphyrin compound is dissolved in a monomer composition in advance and then polymerized to obtain a lens. Further, PTL 2 discloses a method of obtaining a lens by mixing a tetraazaporphyrin compound with a prepolymer and then heat-curing the mixture.

However, when an attempt was made to impart antiglare performance by laminating a cured body containing a tetraazaporphyrin compound on an optical substrate such as a plastic lens, it became clear that the weather resistance was insufficient for use as a spectacle lens.

CITATION LIST

Patent Literature

[PTL 1] JP 2008-134618 A
[PTL 2] JP 2011-237730 A

SUMMARY OF INVENTION

Technical Problem

An object of the present invention is to provide a curable composition for an optical material, that can be suitably used as a coating material that can easily provide an optical material having good antiglare properties and excellent weather resistance.

Solution to Problem

The present inventors have made extensive studies in order to solve the above problems. As a result, the present inventors have found that the above problems can be solved by adding an ultraviolet absorber having a maximum absorption wavelength of 330 to 350 nm to a tetraazaporphyrin compound at a specific ratio, and have completed the present invention.

That is, the present invention is as follows.

[1] A curable composition for an optical material, containing (A) 100 parts by mass of a radical polymerizable monomer, (B) 0.005 to 0.5 parts by mass of a tetraazaporphyrin compound having a maximum absorption wavelength in a range of 560 nm or more and 620 nm or less, and (C) 0.1 to 10 parts by mass of an ultraviolet absorber having a maximum absorption wavelength in a range of 330 nm or more and 350 nm or less.

The present invention can take the following modes.

[2] The curable composition for an optical material as set forth in [1], wherein the tetraazaporphyrin compound (B) is a tetraazaporphyrin compound represented by the following formula (1):

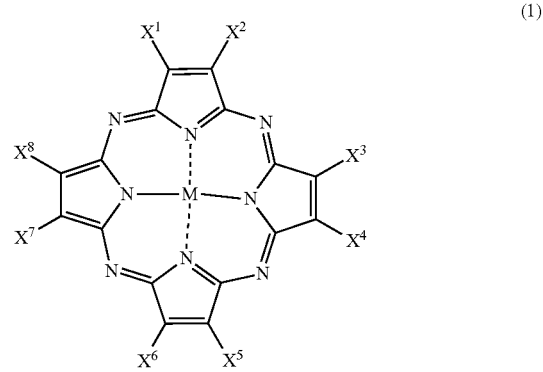

(1)

wherein, $X^1$ to $X^8$ each independently represent a hydrogen atom, a halogen atom, a nitro group, a cyano group, a hydroxy group, an amino group, a carboxy group, a sulfonic acid group, a linear, branched or cyclic alkyl group having 1 to 20 carbon atoms, a linear, branched or cyclic alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linking group; and M represents two hydrogen atoms, a divalent metal atom, a divalent mono-substituted metal atom, a trivalent substituted metal atom, a tetravalent substituted metal atom, or a metal oxide atom.

[3] A cured body obtained by curing the curable composition for an optical material as set forth in [1] or [2].

[4] An optical material obtained by laminating an optical substrate and the cured body as set forth in [3].

[5] The optical material as set forth in [4], wherein the cured body has a thickness of 5 to 70 μm.

[6] The optical material as set forth in [5], wherein the difference between the average transmittance of the wavelength of 600 nm to 700 nm and the average transmittance of the wavelength of 580 nm to 600 nm is 10% or more.

In the present invention, the maximum absorption wavelength and the like of each compound were measured in a solvent that does not affect the measurement. Examples of the solvent include chloroform.

Advantageous Effects of Invention

By using the curable composition for an optical material of the present invention, antiglare performance can be effectively imparted to an optical substrate such as a spectacle lens, and weather resistance is also good, so that its utility value is high.

Further, the curable composition for an optical material of the present invention is suitably used for an optical material application in which a cured body obtained from the curable composition for an optical material and an optical substrate such as a plastic lens substrate are laminated, and the cured body obtained alone exhibits the excellent effects described above.

DESCRIPTION OF EMBODIMENTS

The curable composition for an optical material of the present invention is a curable composition for an optical material, containing (A) 100 parts by mass of a radical polymerizable monomer, (B) 0.005 to 0.5 parts by mass of a tetraazaporphyrin compound having a maximum absorption wavelength in a range of 560 nm or more and 620 nm or less, and (C) 0.1 to 10 parts by mass of an ultraviolet absorber having a maximum absorption wavelength in a range of 330 nm or more and 350 nm or less.

Hereinafter, each component will be described.

<(A) Radical Polymerizable Monomer>

As the radical polymerizable monomer (component (A)), a radical polymerizable compound having a carbon-carbon unsaturated bond can be used without particular limitation, and among them, a polymerizable compound having a (meth)acrylate group can be preferably used. In particular, the radical polymerizable monomer preferably contains a polyfunctional (meth)acrylate compound having two or more (meth)acrylate groups in the molecule. In addition, the radical polymerizable monomer preferably contains a bifunctional (meth)acrylate compound having two (meth) acrylate groups in the molecule (hereinafter may be simply referred to as "(A1) bifunctional (meth)acrylate compound" or "component (A1)") or a polyfunctional (meth)acrylate compound having three or more (meth)acrylate groups in the molecule (hereinafter may be simply referred to as "(A2) polyfunctional (meth)acrylate compound" or "component (A2)"). The radical polymerizable monomer may also contain a monofunctional (meth)acrylate compound having one (meth)acrylate group (hereinafter may be simply referred to as "(A3) monofunctional (meth)acrylate compound" or "component (A3)") or a radical polymerizable monomer having a carbon-carbon unsaturated bond and having no (meth)acrylate group (hereinafter may be simply referred to as "(A4) vinyl compound" or "component (A4)"). The radical polymerizable monomer (A) will be described.

<(A1) Bifunctional (Meth)acrylate Compound>

As the (A1) bifunctional (meth)acrylate compound in the present invention, compounds represented by the following formulae (2), (3) and (4) can be suitably used (hereinafter, the compound represented by the following formula (2) may be simply referred to as component (A1-1), the compound represented by the following formula (3) may be simply referred to as component (A1-2), and the compound represented by the following formula (4) may be simply referred to as component (A1-3)). In addition, a bifunctional (meth) acrylate compound having a urethane bond (hereinafter, may be simply referred to as component (A1-4)), and a bifunctional (meth)acrylate compound not corresponding to any of the component (A1-1), the component (A1-2), the component (A1-3), and the component (A1-4) (hereinafter, may be simply referred to as component (A1-5)) can also be used.

This will be described in detail below.

<(A1-1) Compound Represented by the Following Formula (2)>

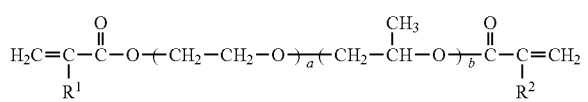

In the formula, $R^1$ and $R^2$ are each a hydrogen atom or a methyl group, a and b are each independently an integer of 0 or more, and (a+b) is an average value of 2 or more and 50 or less.

The compound represented by the above formula (2) is usually obtained in the form of a mixture of molecules having different molecular weights. Therefore, a and b are shown as average values.

Specific examples of the compound represented by the above formula (2) are as follows: diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, a dimethacrylate formed of a mixture of polypropylene glycol and polyethylene glycol (wherein polyethylene has two repeating units and polypropylene has two repeating units), polyethylene glycol dimethacrylate (particularly a=4, b=0, average molecular weight 330), polyethylene glycol dimethacrylate (particularly a=9, b=0, average molecular weight 536), polyethylene glycol dimethacrylate (particularly a=14, b=0, average molecular weight 736), tripropylene glycol dimethacrylate, tetrapropylene glycol dimethacrylate, polypropylene glycol dimethacrylate (particularly a=0, b=7, average molecular weight 536), polyethylene glycol diacrylate (particularly a=3, b=0, average molecular weight 258), polyethylene glycol diacrylate (particularly a=4, b=0, average molecular weight 308), polyethylene glycol diacrylate (particularly a=9, b=0, average molecular weight 508), polyethylene glycol diacrylate (particularly a=14, b=0, average molecular weight 708), and polyethylene glycol methacrylate acrylate (particularly a=9, b=0, average molecular weight 522).

<(A1-2) Compound Represented by the Following Formula (3)>

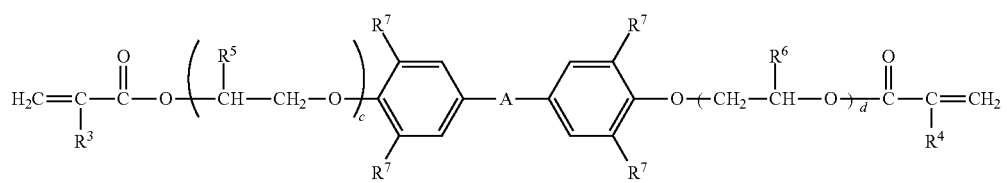

In the formula, $R^3$ and $R^4$ are each a hydrogen atom or a methyl group; $R^5$ and $R^6$ are each a hydrogen atom or a methyl group; $R^7$ is a hydrogen atom or a halogen atom; A is —O—, —S—, —(SO$_2$)—, —CO—, —CH$_2$—, —CH=CH—, —C(CH$_3$)$_2$—, or —C(CH$_3$)(C$_6$H$_5$)—; c and d are each an integer of 1 or more; and (c+d) is an average value of 2 or more and 30 or less.

The compound represented by the above formula (6) is usually obtained in the form of a mixture of molecules having different molecular weights. Therefore, c and d are shown as average values.

Specific examples of the compound represented by the above formula (3) include the following bisphenol A di(meth)acrylates:
2,2-bis[4-(methacryloyloxyethoxy)phenyl]propane ((c+=2, average molecular weight 452),
2,2-bis[4-(methacryloyloxydiethoxy)phenyl]propane ((c+=4, average molecular weight 540),
2,2-bis[4-(methacryloyloxypolyethoxy)phenyl]propane ((c+=7, average molecular weight 672),
2,2-bis[3,5-dibromo-4-(methacryloyloxyethoxy)phenyl]propane ((c+=2, average molecular weight 768),
2,2-bis(4-(methacryloyloxydipropoxy)phenyl)propane ((c+=4, average molecular weight 596),
2,2-bis[4-(acryloyloxydiethoxy)phenyl]propane ((c+=4, average molecular weight 512),
2,2-bis[4-(acryloyloxypolyethoxy)phenyl]propane ((c+=3, average molecular weight 466),
2,2-bis[4-(acryloyloxypolyethoxy)phenyl]propane ((c+=7, average molecular weight 642),
2,2-bis[4-(methacryloyloxypolyethoxy)phenyl]propane ((c+=10,
average molecular weight 804),
2,2-bis[4-(methacryloyloxypolyethoxy)phenyl]propane ((c+=17,
average molecular weight 1116),
2,2-bis[4-(methacryloyloxypolyethoxy)phenyl]propane ((c+=30,
average molecular weight 1684),
2,2-bis[4-(acryloyloxypolyethoxy)phenyl]propane ((c+=10, average molecular weight 776), and
2,2-bis[4-(acryloyloxypolyethoxy)phenyl]propane ((c+=20, average molecular weight 1216).

(A1-3) Compound Represented by the Following Formula (4)>

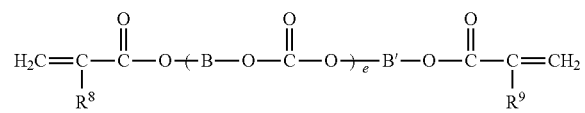

(4)

In the formula, $R^8$ and $R^9$ are each a hydrogen atom or a methyl group, e is an average number of 1 to 20, B and B' may be the same as or different from each other and are each a linear or branched alkylene group having 2 to 15 carbon atoms, and when a plurality of B are present, the plurality of B may be the same group or different groups.

The compound represented by the above formula (4) can be produced by reacting a polycarbonate diol with (meth)acrylic acid. Examples of the polycarbonate diol serving as a raw material include the following. Specific examples thereof include polycarbonate diol (average molecular weight: 500 to 2000) obtained by phosgenation of trimethylene glycol, polycarbonate diol (average molecular weight: 500 to 2000) obtained by phosgenation of tetramethylene glycol, polycarbonate diol (average molecular weight: 500 to 2000) obtained by phosgenation of pentamethylene glycol, polycarbonate diol (average molecular weight: 500 to 2000) obtained by phosgenation of hexamethylene glycol, polycarbonate diol (average molecular weight: 500 to 2000) obtained by phosgenation of octamethylene glycol, polycarbonate diol (average molecular weight: 500 to 2000) obtained by phosgenation of nonamethylene glycol, polycarbonate diol (average molecular weight: 500 to 2000) obtained by phosgenation of triethylene glycol and tetramethylene glycol, polycarbonate diol (average molecular weight: 500 to 2000) obtained by phosgenation of tetramethylene glycol and hexamethylene diglycol, polycarbonate diol (average molecular weight: 500 to 2000) obtained by phosgenation of pentamethylene glycol and hexamethylene glycol, polycarbonate diol (average molecular weight: 500 to 2000) obtained by phosgenation of tetramethylene glycol and octamethylene glycol, polycarbonate diol (average molecular weight: 500 to 2000) obtained by phosgenation of hexamethylene glycol and octamethylene glycol, and polycarbonate diol (average molecular weight: 500 to 2000) obtained by phosgenation of 1-methyltrimethylene glycol.

<(A1-4) Bifunctional (Meth)Acrylate Compound Having Urethane Bond>

The component (A1-4) is typically a reaction product of a polyol, a polyisocyanate, and a hydroxy group-containing (meth)acrylate. Examples of the polyisocyanate include hexamethylene diisocyanate, isophorone diisocyanate, lysine isocyanate, 2,2,4-hexamethylene diisocyanate, dimer acid diisocyanate, isopropylidenebis-4-cyclohexyl isocyanate, dicyclohexylmethane diisocyanate, norbornene diisocyanate, and methylcyclohexane diisocyanate.

On the other hand, examples of the polyol include polyalkylene glycol having a repeating unit of ethylene oxide or propylene oxide having 2 to 4 carbon atoms, or hexamethylene oxide, and polyester diol such as polycaprolactone diol. Examples of the polyol also include polycarbonate diol, polybutadiene diol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, and 1,4-cyclohexanedimethanol.

Examples of the hydroxy group-containing (meth)acrylate include 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate.

Further, a reaction mixture obtained by further reacting a urethane prepolymer obtained by the reaction of the polyisocyanate and the polyol with a hydroxy group-containing (meth)acrylate such as 2-hydroxy (meth)acrylate, or a urethane (meth)acrylate which is a reaction mixture obtained by directly reacting the diisocyanate with a hydroxy group-containing (meth)acrylate such as 2-hydroxy (meth)acrylate can also be used.

As the bifunctional (meth)acrylate compound having a urethane bond, commercially available products can be used without any limitation, and examples thereof include U-2PPA (molecular weight: 482), UA-122P (molecular weight: 1100), U-122P (molecular weight: 1100), U-108A, U-200PA, UA-511, U-412A, UA-4100, UA-4200, UA-4400, UA-2235PE, UA-160TM, UA-6100, UA-6200, U-108, UA-4000, and UA-512 manufactured by Shin-Nakamura Chemical Co., Ltd., EB4858 (molecular weight:

454) manufactured by Daicel-UCB Co., Ltd., and UX-2201, UX3204, UX4101, 6101, 7101, and 8101 manufactured by Nippon Kayaku Co., Ltd.

<(A1-5) Other Bifunctional (Meth)Acrylate Compound>

Examples of the component (A1-5) include compounds having a (meth)acrylic group at both ends of an alkylene group which may have a substituent. The component (A1-5) preferably has an alkylene group having 6 to 20 carbon atoms. Specific examples thereof include 1,6-hexanediol diacrylate, 1,6-hexanediol dimethacrylate, 1,9-nonanediol diacrylate, 1,9-nonanediol dimethacrylate, 1,10-decanediol diacrylate, and 1,10-decanediol dimethacrylate.

Other examples of the component (A1-5) can also include bifunctional (meth)acrylate compounds containing a sulfur atom. The sulfur atom preferably forms a part of the molecular chain as a sulfide group. Specific examples of the bifunctional (meth)acrylate compound containing a sulfur atom include bis(2-methacryloyloxyethylthioethyl) sulfide, bis(methacryloyloxyethyl) sulfide, bis(acryloyloxyethyl) sulfide, 1,2-bis(methacryloyloxyethylthio) ethane, 1,2-bis(acryloyloxyethyl) ethane, bis(2-methacryloyloxyethylthioethyl) sulfide, bis(2-acryloyloxyethylthioethyl) sulfide, 1,2-bis(methacryloyloxyethylthioethylthio) ethane, 1,2-bis(acryloyloxyethylthioethylthio) ethane, 1,2-bis(methacryloyloxyisopropylthioisopropyl) sulfide, and 1,2-bis(acryloyloxyisopropylthioisopropyl) sulfide.

In the component (A1-1), the component (A1-2), the component (A1-3), the component (A1-4), and the component (A1-5) described above, a single component can be used, or a plurality of them as described above can be used. When a plurality of the components are used, the reference mass of the component (A1) is the total amount of the plurality of the components.

<(A2) Polyfunctional (Meth)Acrylate Compound>

Examples of the component (A2) include a compound represented by the following formula (5) (hereinafter may be simply referred to as component (A2-1)), a polyfunctional (meth)acrylate compound having a urethane bond (hereinafter may be simply referred to as component (A2-2)), and a polyfunctional (meth)acrylate compound not corresponding to the component (A2-1) and the component (A2-2) (hereinafter may be simply referred to as component (A2-3)).

<(A2-1) Compound Represented by the Following Formula (5)>

Examples of the polyfunctional (meth)acrylate compound include a compound represented by the following formula (5).

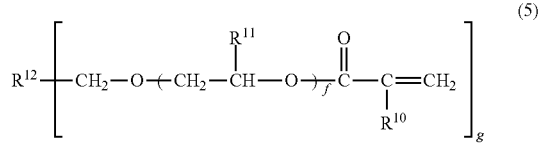

In the formula, $R^{10}$ is a hydrogen atom or a methyl group, $R^{11}$ is a hydrogen atom or an alkyl group having 1 to 2 carbon atoms, $R^{12}$ is a 3- to 6-valent organic group having 1 to 10 carbon atoms, f is an average number of 0 to 3, and g is a number of 3 to 6.

The alkyl group having 1 to 2 carbon atoms represented by $R^{11}$ is preferably a methyl group. Examples of the organic group represented by $R^{12}$ include groups derived from polyols, 3- to 6-valent hydrocarbon groups, and 3- to 6-valent urethane bond-containing organic groups.

Specific examples of the compound represented by the above formula (5) are as follows: trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, and ditrimethylolpropane tetraacrylate.

<(A2-2) Polyfunctional (Meth)Acrylate Compound Having Urethane Bond>

The component (A2-2) is obtained by reacting the polyisocyanate compound described in the component (A1-4) with a polyol compound such as glycerin, trimethylolpropane, pentaerythritol, or dipentaerythritol, and is a compound having three or more (meth)acrylate groups in the molecule. As the component (A2-2), commercially available products can be used without any limitation, and examples thereof include U-4HA (molecular weight: 596, number of functional groups: 4), U-6HA (molecular weight: 1019, number of functional groups: 6), U-6LPA (molecular weight: 818, number of functional groups: 6), and U-15HA (molecular weight: 2300, number of functional groups: 15) manufactured by Shin-Nakamura Chemical Co., Ltd.

<(A2-3) Other Polyfunctional (Meth)Acrylate Compound>

The component (A2-3) is a compound obtained by modifying the terminal of a polyester compound with a (meth)acrylic group. Various polyester (meth)acrylate compounds are commercially available depending on the molecular weight of the polyester compound as a raw material and the amount of modification of the (meth)acrylic group, and these can be used. Specific examples thereof include a tetrafunctional polyester oligomer (molecular weight: 2500 to 3500, manufactured by Daicel-UCB Co., Ltd., EB80, etc.), a hexafunctional polyester oligomer (molecular weight: 6000 to 8000, manufactured by Daicel-UCB Co., Ltd., EB450, etc.), a hexafunctional polyester oligomer (molecular weight: 45000 to 55000, manufactured by Daicel-UCB Co., Ltd., EB1830, etc.), and a tetrafunctional polyester oligomer (particularly molecular weight: 10,000, manufactured by DKS Co., Ltd., GX8488B, etc.).

By using the component (A2) exemplified above (component (A2-1), component (A2-2), and component (A2-3)), the crosslinking density can be increased by curing, and the surface hardness of the resulting cured body can be increased. Therefore, in particular, in the case of laminating a cured body on an optical substrate, it is preferable to contain the component (A2). Among the components (A2), it is particularly preferable to use the component (A2-1).

In the component (A2-1), the component (A2-2), and the component (A2-3) described above, a single component can be used, or a plurality of them as described above can be used. When a plurality of the components are used, the reference mass of the component (A2) is the total amount of the plurality of the components.

<(A3) Monofunctional (Meth)Acrylate Compound>

Examples of the component (A3) include a compound represented by the following formula (6).

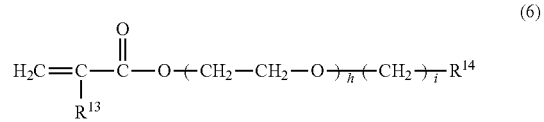

In the formula, $R^{13}$ is a hydrogen atom or a methyl group, $R^{14}$ is a hydrogen atom, a methyldimethoxysilyl group, a trimethoxysilyl group, or a glycidyl group, h is an integer of 0 to 10, and i is an integer of 0 to 20.

Specific examples of the compound represented by the above formula (6) are as follows.

Methoxypolyethylene glycol methacrylate (particularly average molecular weight: 293), methoxypolyethylene glycol methacrylate (particularly average molecular weight: 468), methoxypolyethylene glycol acrylate (particularly average molecular weight: 218), methoxypolyethylene glycol acrylate (particularly average molecular weight: 454), stearyl methacrylate, lauryl methacrylate, methyl acrylate, ethyl acrylate, butyl acrylate, octyl acrylate, lauryl acrylate, γ-methacryloyloxypropyltrimethoxysilane, γ-methacryloyloxypropylmethyldimethoxysilane, and glycidyl methacrylate.

<(A4) Vinyl Compound>

Examples of the vinyl compound (A4) include methyl vinyl ketone, ethyl vinyl ketone, ethyl vinyl ether, styrene, vinylcyclohexane, butadiene, 1,4-pentadiene, divinyl sulfide, divinyl sulfone, 1,2-divinylbenzene, 1,3-divinyl-1,1,3,3-tetramethylpropanedisiloxane, diethylene glycol divinyl ether, divinyl adipate, divinyl sebacate, ethylene glycol divinyl ether, divinyl sulfoxide, divinylpersulfide, dimethyldivinylsilane, 1,2,4-trivinylcyclohexane, methyltrivinylsilane, N-vinylpyrrolidone, α-methylstyrene, and α-methylstyrene dimer.

Among the vinyl compounds (A4) exemplified above, α-methylstyrene and α-methylstyrene dimer function as a polymerization regulator to improve the moldability of the cured body.

<Blending Ratio of Each Component in Component (A)>

The radical polymerizable monomer (A) preferably contains the component (A1) and the component (A2), and if necessary, the component (A3) and the component (A4). When the total amount of the components (A) is 100 parts by mass, the respective components are preferably 30 to 90 parts by mass of the component (A1), 5 to 50 parts by mass of the component (A2), 0 to 20 parts by mass of the component (A3), and 0 to 20 parts by mass of the component (A4) in consideration of the hardness and mechanical properties of the resulting cured body.

<(B) Tetraazaporphyrin Compound>

Next, the tetraazaporphyrin compound will be described.

The tetraazaporphyrin compound (B) used in the present invention (hereinafter sometimes referred to as "component (B)") is a compound having a maximum absorption wavelength in a range of 560 nm or more and 620 nm or less. By blending this component (B), it is possible to impart antiglare performance to the cured body.

In the present invention, the maximum absorption wavelength means a wavelength of a peak of maximum absorption (a peak of a convex spectrum) appearing in an absorption spectrum. In addition, a plurality of maximum absorption wavelengths may be confirmed, and in this case, at least one maximum absorption wavelength may be confirmed in the wavelength range specified in the present invention. For example, the tetraazaporphyrin compound having the maximum absorption wavelengths in the range of 560 nm or more and 620 nm or less means a tetraazaporphyrin compound having at least one of the maximum absorption wavelengths in the range of 560 nm or more and 620 nm or less.

In the present invention, the tetraazaporphyrin compound means a compound having a tetraazaporphyrin skeleton. The tetraazaporphyrin skeleton is a heterocyclic skeleton in which four pyrrole rings are linked by a nitrogen atom, and is specifically represented by the following formula (A).

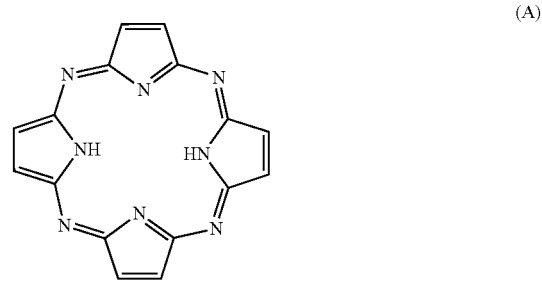 [SMILES: C1=Cc2nc1nc1ccc(nc3nc(nc4ccc(n2)[nH]4)C=C3)[nH]1]

(A)

The tetraazaporphyrin compound may be a metal complex having the tetraazaporphyrin skeleton. The metal constituting the metal complex is not particularly limited, and examples thereof include copper, ruthenium, rhodium, palladium, osmium, iridium, and platinum. The tetraazaporphyrin compound may have a substituent on each pyrrole ring.

The tetraazaporphyrin compound is preferably a tetraazaporphyrin compound represented by the following formula (1).

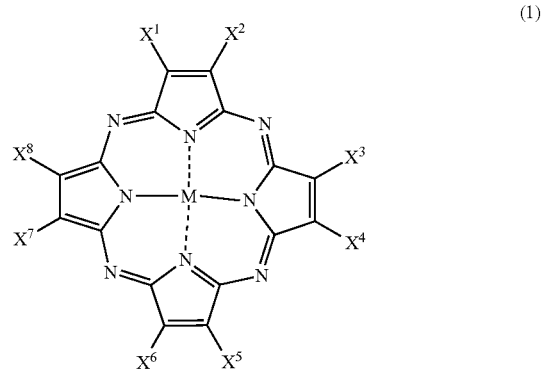

(1)

In the formula (1), $X^1$ to $X^8$ each independently represent a hydrogen atom, a halogen atom, a nitro group, a cyano group, a hydroxy group, an amino group, a carboxy group, a sulfonic acid group, a linear, branched or cyclic alkyl group having 1 to 20 carbon atoms, a linear, branched or cyclic alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linking group; and M represents two hydrogen atoms, a divalent metal atom, a divalent mono-substituted metal atom, a trivalent substituted metal atom, a tetravalent substituted metal atom, or a metal oxide atom.

The term "forming a ring excluding an aromatic ring via a linking group" means, for example, that two groups among $X^1$ to $X^6$ form a ring excluding an aromatic ring via a linking group, and preferably means that groups bonded to the same pyrrole ring among $X^1$ to $X^6$ (i.e., $X^1$ and $X^2$, $X^3$ and $X^4$, $X^5$ and $X^6$, $X^7$ and $X^8$) form a ring excluding an aromatic ring via a linking group.

In addition, specifically, M is preferably copper, vanadium oxide, nickel, zinc, iron, cobalt, manganese, magnesium, titanium oxide, ruthenium, rhodium, palladium, osmium, iridium, platinum, or the like.

As the tetraazaporphyrin compound represented by the general formula (1), commercially available compounds can be used without any limitation. For example, tetraazaporphyrin compounds sold by Tokyo Chemical Industry Co., Ltd. and the like, and trade names FDG-005, FDG-006, FDG-007, FDR-001 and the like manufactured by Yamada Chemical Co., Ltd. can be used. Further, trade name PD-320 and the like manufactured by Yamamoto Chemicals, Inc. can be used.

Among the tetraazaporphyrin compounds represented by the general formula (1), it is more preferable to use a tetraazaporphyrin compound having a maximum absorption wavelength of 580 nm or more and 610 nm or less in order to obtain a cured body having excellent antiglare performance.

Further, in order to achieve good handling and exhibit the effects efficiently, the absorption coefficient of the component (B) at the maximum absorption wavelength in the range of 560 nm or more and 620 nm or less is preferably in a range of 10 to 1000 (L/(g·cm)). By satisfying this range, an effect of excellent antiglare performance can be obtained without lowering the strength of the resulting cured body. In order to further enhance the effect, the absorption coefficient of the compound (B) is more preferably 25 to 800 (L/(g·cm)), and still more preferably 50 to 500 (L/(g·cm)).

Further, in order for the component (B) to exhibit the antiglare effect more effectively, the half-value width of the maximum absorption wavelength in the range of 560 nm or more and 620 nm or less of the component (B) is preferably 40 nm or less. By satisfying this range, the antiglare performance of the cured body can be effectively exhibited. That is, it is possible to reduce glare of sunlight, headlights of automobiles, and the like, and discomfort, blurred contrast, visual fatigue, and the like associated therewith. In order to further enhance the effect, the half-value width of the component (B) is more preferably 35 nm or less, and still more preferably 30 nm or less. The half-value width is preferably as narrow as possible because it can be controlled more, but it should be 5 nm or more in view of industrial production of the component (B). Therefore, the half-value width of the maximum absorption wavelength of the component (B) is preferably 5 nm or more and 40 nm or less, more preferably 5 nm or more and 35 nm or less, and still more preferably 5 nm or more and 30 nm or less.

The half-value width of the maximum absorption wavelength is calculated by reading the wavelength A1 (nm) and the wavelength A2 (nm) at which the absorbance at the maximum absorption wavelength becomes a half value and obtaining the absolute value of the difference between these wavelengths.

It is important that the blending amount of the component (B) is 0.005 to 0.5 parts by mass per 100 parts by mass of the component (A). By satisfying this range, it is possible to impart effective antiglare performance without lowering the strength of the resulting cured body. In order to further enhance the effect, the blending amount of the component (B) is more preferably 0.005 to 0.2 parts by mass per 100 parts by mass of the component (A).

<(C) Ultraviolet Absorber>

The ultraviolet absorber (C) used in the present invention (hereinafter, sometimes referred to as "component (C)") is an ultraviolet absorber having a maximum absorption wavelength in a range of 330 nm or more and 350 nm or less. The component (C) has the role of cutting light in the Soret band of the tetraazaporphyrin compound (B) and improving the weather resistance of the cured body. The component (C) does not include a compound corresponding to the component (B).

The component (C) is not particularly limited as long as it is an ultraviolet absorber having the above-mentioned maximum absorption wavelength, and examples thereof include a benzotriazole compound, a benzophenone compound, and a triazine compound. Specific examples of the component (C) include the following compounds:

Benzotriazole compounds such as 2-(2-hydroxy-5-methylphenyl)-2H-benzotriazole, 2-(3,5-di-tert-pentyl-2-hydroxyphenyl)-2H-benzotriazole, 2-(2H-benzotriazol-2-yl)-4-methyl-6-(3,4,5,6-tetrahydrophthalimidylmethyl)pheno 1,2-(2-hydroxy-5-tert-octylphenyl)-2H-benzotriazole, 2-(2H-benzotriazol-2-yl)-4,6-bis(1-methyl-1-phenylethyl) phenol, 2,2'-methylenebis[6-(2H-benzotriazol-2-yl)-4-(1,1,3,3-tetramethylbutyl)phenol], and 2-(2H-benzotriazol-2-yl)-4-tert-butylphenol; benzophenone compounds such as 2,2',4,4'-tetrahydroxybenzophenone and 2,2'-hydroxy-4-methoxybenzophenone; and triazine compounds such as 2-(4,6-diphenyl-1,3,5-triazin-2-yl)-5-[2-(2-ethylhexanoyloxy)ethoxy]phenol, 2,4-bis(2-hydroxy-4-butyoxyphenyl)-6-(2,4-bis-butyloxyphenyl)-1,3,5-triazine, 2-[4-[(2-hydroxy-3-(2'-ethyl)hexyl)oxy]-2-hydroxyphenyl]-4,6-bis(2, 4-dimethylphenyl)-1,3,5-triazine.

These components (C) may be used alone or in combination of two or more thereof. When a plurality of the components are used, the reference mass of the component (C) is the total amount of the plurality of the components.

In the present invention, the absorption coefficient of the component (C) at the maximum absorption wavelength in the range of 330 nm or more and 350 nm or less is preferably in a range of 10 to 200 (L/(g·cm)). By satisfying this range, the cured body can be formed without lowering the strength thereof.

For the purpose of cutting off light in the Soret band of the tetraazaporphyrin compound (B), the ratio of the absorption coefficients (L/(g·cm)) at the maximum absorption wavelengths from 330 to 350 nm of the components (B) and (C) (absorption coefficient of the component (B):absorption coefficient of the component (C)) is preferably 0.5:1 or more and 5:1 or less, and more preferably 0.5:1 or more and 4:1 or less.

In addition, it is preferable that the absolute value of the difference between the maximum absorption wavelengths of the components (B) and (C) (the maximum absorption wavelength of the component (B)—the maximum absorption wavelength of the component (C)) in the range of 330 to 350 nm is 10 nm or less because light in the Soret band can be effectively cut.

In order to effectively impart weather resistance to the cured body, it is important that the blending amount of the component (C) is 0.1 to 10 parts by mass per 100 parts by mass of the component (A). In particular, the blending amount is more preferably 0.5 to 5 parts by mass in order to effectively impart weather resistance without lowering the strength of the cured body.

In order to effectively impart weather resistance to the cured body, the amount of the component (C) relative to the component (B) (the amount of the component (C)/the amount of the component (B)) in the curable composition for an optical material is preferably 1 to 100, more preferably 5 to 70, and still more preferably 10 to 50.

In addition, for the purpose of effectively cutting light in the Soret band of the component (B), it is preferable to adjust the addition amounts of the components (B) and (C) so that the ratio of the absorbances at the maximum absorption wavelength at 330 to 350 nm (the absorbance of the component (B)) the absorbance of the component (C)) of the addition amounts of the components (B) and (C) is in a range of 1:4 or more and 1:30 or less. By satisfying this range, a cured body having good weather resistance can be obtained. In order to further enhance such an effect, it is more preferable to adjust the addition amounts so that the ratio of the absorbances of the component (B) and the component (C) (the absorbance of the component (B): the absorbance of the component (C)) becomes 1:5 or more and 1:25 or less.

<Additives>

The curable composition for an optical material of the present invention contains the component (A), the component (B), and the component (C) as essential components. In addition to the above components, the composition can be blended with the following known additives.

<Polymerization Initiator>

In the present invention, in order to form a cured body, a radical polymerization initiator such as a thermal polymerization initiator or a photopolymerization initiator is preferably blended in the radical polymerizable composition of the present invention. A radical polymerization initiator such as a known thermal polymerization initiator or photopolymerization initiator can be used without particular limitation, and examples of typical polymerization initiators include the following.

Examples of the thermal polymerization initiator include diacyl peroxides such as benzoyl peroxide, p-chlorobenzoyl peroxide, decanoyl peroxide, lauroyl peroxide, and acetyl peroxide; peroxy esters such as tert-butyl peroxy-2-ethylhexanoate, tert-butyl peroxyneodecanoate, cumyl peroxyneodecanoate, and tert-butyl peroxybenzoate; percarbonates such as diisopropyl peroxydicarbonate and di-sec-butyl peroxydicarbonate; and azo compounds such as azobisisobutyronitrile.

As the photopolymerization initiator, an acetophenone-based or acylphosphine-based compound can be employed. Specific examples thereof include benzophenone; acetophenone-based compounds such as 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, and 2-benzyl-2-dimethylamino-1-(4-morpholinophenyl)-butanone-1,1-(4-isopropylphen yl)-2-hydroxy-2-methylpropan-1-one; α-dicarbonyl-based compounds such as 1,2-diphenylethanedione and methylphenylglycoxylate; acylphosphine oxide-based compounds such as 2,6-dimethylbenzoyl diphenylphosphine oxide, bis(2,4,6-trimethylbenzoyl)-phenylphosphine oxide, bis(2,6-dimethoxybenzoyl)-2,4,4-trimethyl-pentylphosphine oxide, 2,4,6-trimethylbenzoyldiphenylphosphine oxide, 2,4,6-trimethylbenzoyldiphenylphosphine acid methyl ester, 2,6-dichlorbenzoyldiphenylphosphine oxide, and 2,6-dimethoxybenzoyldiphenylphosphine oxide; and 1,2-octanedione-1-[4-(phenylthio)-2-(o-benzoyloxime).

These polymerization initiators may be used alone or in combination of two or more thereof. The thermal polymerization initiator and the photopolymerization initiator may be used in combination. When the photopolymerization initiator is used, a known polymerization accelerator such as a tertiary amine can be used in combination.

In the present invention, when a polymerization initiator is used, the amount of the polymerization initiator used is preferably in a range of 0.01 to 0.5 parts by mass, and more preferably 0.05 to 0.4 parts by mass, relative to 100 parts by mass of the total amount of the component (A).

<Other Blending Components>

In the curable composition for an optical material of the present invention, various blending agents known per se, for example, various stabilizers such as a surfactant, a release agent, an infrared absorber, an ultraviolet stabilizer, an antioxidant, a coloring inhibitor, an antistatic agent, a fluorescent dye, a dye, a pigment, and a fragrance, additives, and a polymerization regulator can be mixed as necessary as long as the effects of the present invention are not impaired. Furthermore, in addition to the ultraviolet absorber (B), a known ultraviolet absorber whose maximum absorption wavelength is not in the range of 330 to 350 nm can also be contained.

Examples of the stabilizer include a hindered amine light stabilizer, a hindered phenol antioxidant, a phenol-based radical scavenger, and a sulfur-based antioxidant. The amount of the stabilizer added is preferably 0.01 to 10 parts by mass, and more preferably 0.1 to 5 parts by mass, per 100 parts by mass of the component (A).

As the surfactant, known surfactants such as silicone-based surfactants having a silicone chain (polyalkylsiloxane unit) as a hydrophobic group and fluorine-based surfactants having a fluorocarbon chain can be used without any limitation. By adding the surfactant, when an optical material is formed by laminating the cured body of the present invention on an optical substrate by a coating method described later, wettability to the optical substrate or a primer layer formed on the optical substrate for the purpose of improving adhesion or the like can be improved without adversely affecting adhesion, and occurrence of poor appearance can be prevented.

As the silicone-based surfactant and the fluorine-based surfactant which can be suitably used in the present invention, commercially available ones can be used without any limitation, and for example, "L-7001", "L-7002", "L-7604", and "FZ-2123" manufactured by Dow Corning Toray Co., Ltd., "Megafac F-470", "Megafac F-1405", and "Megafac F-479" manufactured by DIC Corporation, and "Fluorad FC-430" manufactured by Sumitomo 3M Limited. can be suitably used. When the surfactant is used, two or more kinds thereof may be used as a mixture. The addition amount of the surfactant is not particularly limited, but is preferably 0.001 to 1 part by mass, more preferably 0.01 to 0.5 parts by mass, per 100 parts by mass of the component (A).

<Production Method of Cured Body>

The curable composition for an optical material of the present invention can be produced by a known method. For example, the curable composition for an optical material can be produced by kneading and dissolving each component.

The cured body of the present invention is also not particularly limited, and a known method of curing the curable composition for an optical material can be employed. Specifically, it can be cured by heat, irradiation with ultraviolet rays (UV rays), α-rays, β-rays, γ-rays or the like, or a combination of both.

The cured body to be laminated on the optical substrate is also not particularly limited, and a known method can be employed. For example, a curable composition for an optical material may be applied onto an optical substrate such as a plastic lens by a coating method or the like, and the composition may be cured. In this case, a radical polymerization initiator such as a thermal polymerization initiator or a photopolymerization initiator is preferably blended in the curable composition for an optical material of the present invention. When the curable composition for an optical material of the present invention is applied to an optical substrate and cured to obtain a cured body, photo-curing is preferably employed because a uniform film thickness can be obtained.

When the curable composition for an optical material of the present invention is photocured, among the curing conditions, particularly the UV intensity influences the properties of the resulting cured body. The illumination conditions are affected by the type and amount of the photopolymerization initiator and the type of the monomer, and thus cannot be generally limited. However, in general, it is preferable to select conditions such that UV light of 50 to 500 mW/cm$^2$ is irradiated at a wavelength of 365 nm for a time of 0.5 to 5 minutes.

In the case of producing an optical material by a coating method, a cured body can be obtained by applying the curable composition for an optical material of the present invention mixed with a photopolymerization initiator onto an optical substrate by a spin coating method or the like, placing it in an inert gas such as nitrogen, and then performing UV irradiation. Then, in order to enhance adhesion between a cured body and an optical substrate such as a plastic lens, it is preferable to perform heat treatment in a temperature range of 80 to 120° C. for about 0.5 to 5 hours. In this manner, an optical material in which an optical substrate such as a plastic lens, another layer such as a primer coating layer formed as necessary, and a cured body are laminated in this order can be obtained. The thickness of the cured body formed by the coating method is preferably 5 to 70 μm from the viewpoint of effectively imparting antiglare properties while imparting smoothness to the cured body.

In order for an optical material obtained by laminating a cured body made of the curable composition for an optical material of the present invention and an optical substrate to have effective antiglare performance, the difference between the average transmittance at a wavelength of 600 nm to 700 nm and the average transmittance at a wavelength of 580 nm to 600 nm ((average transmittance at a wavelength of 600 nm to 700 nm)−(average transmittance at a wavelength of 580 nm to 600 nm)) is preferably 10% or more. In the present invention, the "average transmittance" is a value obtained by averaging measured values measured at a 5 nm pitch in each wavelength range.

<Optical Substrate, Optical Material>

The optical material according to the present invention is obtained by laminating an optical substrate and a cured body made of the curable composition for an optical material.

Examples of the optical substrate to be laminated with the cured body made of the curable composition for an optical material of the present invention include a plastic lens substrate. The plastic lens substrate is not particularly limited, and a known substrate can be used. Examples thereof include thermoplastic resin lenses such as (meth)acrylic resins and polycarbonate resins, and crosslinkable resin lenses such as polyfunctional (meth)acrylic resins, allyl resins, thiourethane resins, urethane resins, and thioepoxy resins. In addition, the present invention can be applied to a plastic lens substrate in which a hard coat layer or the like is laminated on the plastic lens substrate.

The optical substrate may be subjected to a chemical treatment with an alkali solution, an acid solution, or the like, or a physical treatment with corona discharge, plasma discharge, polishing, or the like, in order to improve adhesion to the resulting cured body.

In addition, in the optical material of the present invention, another layer may be laminated between an optical substrate and a cured body as long as the effects of the present invention are not impaired. For example, before the curable composition for an optical material is applied onto the surface of an optical substrate by a coating method to form a cured body, a primer such as a polyurethane-based primer, a polyester-based primer, a polyvinyl acetal-based primer, or an epoxy-based primer may be applied onto the surface of the optical substrate and cured. Among them, the curable composition for an optical material of the present invention can be particularly suitably applied to the case where an optical substrate having a primer layer as an adhesive layer is used in order to enhance adhesion between an optical substrate such as a plastic lens substrate and a cured body.

As the primer layer, a known polyurethane resin can be used. Among them, from the viewpoint of adhesion, a primer layer composed of a moisture-curable polyurethane resin/a precursor thereof as described in Japanese Patent No. 4405833 or a water-dispersed urethane emulsion as described in Japanese Patent Nos. 5016266 and 5084727 is preferable.

<Secondary Processing of Cured Body; Lamination of Coating Layer>

The optical material produced by the above method can be used as it is, but if necessary, another coating layer may be laminated on one side or both sides.

Specific examples of the other coating layer include a primer layer, a hard coat layer, an antireflection layer, an antifogging coat layer, an antifouling layer, and a water-repellent layer. These coating layers may be used alone, or a plurality of coating layers may be used in the form of a multilayer. When coating layers are provided on both surfaces, the same coating layer or different coating layers may be provided on each surface.

Each of these coating layers may be combined with a known ultraviolet absorber, an infrared absorber for protecting eyes from infrared rays, a light stabilizer or an antioxidant for improving weather resistance of a lens, a dye or a pigment for improving fashionability of a lens, a photochromic dye or a photochromic pigment, an antistatic agent, and other known additives for improving performance of a lens. For the layer to be coated by coating, various leveling agents may be used for the purpose of improving coatability.

The hard coat layer is obtained by applying and curing a coating liquid containing a particulate inorganic substance such as an organosilicon compound, tin oxide, silicon oxide, zirconium oxide, or titanium oxide. For the purpose of improving impact resistance or improving adhesion to the hard coat layer, a primer layer containing polyurethane as a main component can be provided on the surface of the plastic lens. Further, an antireflection layer may be formed on the hard coat layer using silicon oxide, titanium dioxide, zirconium oxide, tantalum oxide or the like in order to impart antireflection performance. Furthermore, a water-repellent film can be formed on the antireflection layer by using an organosilicon compound having a fluorine atom for improving water repellency.

EXAMPLES

Hereinafter, the present invention will be specifically described with reference to Examples, but the present invention is not limited to these Examples. The evaluation methods used in the Examples of the present invention are as follows.

[Method for Measuring Maximum Absorption Wavelength]

As a measuring instrument, Shimadzu Spectrophotometer UV-2550 manufactured by Shimadzu Corporation was used. The measurement was carried out by preparing a solution (concentration: $3.0 \times 10^{-3}$ mg/mL) in which the object to be measured was dissolved in a solvent (chloroform), and using a quartz cell having an optical path length of 10 mm.

[Method for Measuring Average Transmittance]

The transmittance at wavelengths of 580 to 700 nm was measured using a Shimadzu spectrophotometer UV-2550 manufactured by Shimadzu Corporation, and the average value of the transmittance (T (%)) for each 5 nm was calculated, whereby the average transmittance at wavelengths of 600 nm to 700 nm and the average transmittance at wavelengths of 580 nm to 600 nm were calculated.

[Weather Resistance Test]

Using a Xenon weather meter X25 manufactured by Suga Test Instruments Co., Ltd., the change in absorption at the maximum absorption wavelength of the tetraazaporphyrin compound between the initial state (before use of the weather meter) and after using for 96 hours was evaluated as the residual rate (%).

Residual rate (%)=(initial absorbance)/(absorbance after using a weather meter for 96 hours)×100

Abbreviations and names of the compounds used in the Examples are shown below.

Component (A): Radical polymerizable monomer

Component (A1-1):

ADE-400: polyethylene glycol diacrylate (in the formula (2), a=9, b=0, average molecular weight 508).

14G: polyethylene glycol dimethacrylate (in the formula (2), a=14, b=0, average molecular weight 736).

Component (A1-2):

A-BPE-10: 2,2-bis[4-(acryloyloxypolyethoxy)phenyl]propane (in the formula (3), c+=10, average molecular weight 776).

KT50: 2,2-bis[4-(methacryloyloxypolyethoxy)phenyl]propane (in the formula (3), c+=10, average molecular weight 804).

Component (A1-3):

A-PC: ester compound of polycarbonate diol (average molecular weight 500) obtained by phosgenation of pentamethylene glycol and hexamethylene glycol, and acrylic acid.

Component (A2-1):

TMPT: trimethylolpropane trimethacrylate.

Component (A3):

GMA glycidyl methacrylate

TSL8370: γ-methacryloyloxypropyltrimethoxysilane

Component (B): Tetraazaporphyrin compound

FDG-005: tetraazaporphyrin compound manufactured by Yamada Chemical Co., Ltd., maximum absorption wavelength: 581 nm, absorption coefficient: 140 (L/(g·cm)), half-value width: 19 nm, Soret band maximum absorption wavelength: 338 nm, absorption coefficient: 60 (L/(g·cm))

FDG-006: tetraazaporphyrin compound manufactured by Yamada Chemical Co., Ltd., maximum absorption wavelength: 584 nm, absorption coefficient: 80 (L/(g·cm)), half-value width: 25 nm, Soret band maximum absorption wavelength: 335 nm, absorption coefficient: 48 (L/(g·cm))

FDG-007: tetraazaporphyrin compound manufactured by Yamada Chemical Co., Ltd., maximum absorption wavelength: 591 nm, absorption coefficient: 145 (L/(g·cm)), half-value width: 19 nm, Soret band maximum absorption wavelength: 342 nm, absorption coefficient: 80 (L/(g·cm))

Component (C): Ultraviolet absorber having a maximum absorption wavelength in the range of 330 to 350 nm UVA-1: 2-(2-hydroxy-5-tert-octylphenyl)-2H-benzotriazole, maximum absorption wavelength: 342 nm, absorption coefficient: 45 (L/(g·cm))

UVA-2: 2-(4,6-diphenyl-1,3,5-triazin-2-yl)-5-2-(2-ethylhexanoyloxy)phenol, maximum absorption wavelength: 338 nm, absorption coefficient: 35 (L/(g·cm))

(Other Additives)

(Radical Polymerization Initiator)

PI phenylbis(2,4,6-trimethylbenzoyl)phosphine oxide (Leveling agent)

L7001: polyether-modified silicone (manufactured by Dow Corning Toray Co., Ltd.)

(Ultraviolet absorbers other than component (C) whose maximum absorption wavelength is outside the range of 330 to 350 nm)

(This may be simply referred to as "ultraviolet absorber other than component (C)".)

UVA-3: 2,4-dihydroxybenzophenone, maximum absorption wavelength: 325 nm, absorption coefficient: 35 (L/(g·cm))

UVA-4: 2-hydroxy-4-octyloxybenzophenone, maximum absorption wavelength: 328 nm, absorption coefficient: 30 (L/(g·cm))

Example 1

To 100 parts by mass of monomer mixture (I) composed of (A1-1) 17 parts by mass of ADE-400 and 6 parts by mass of 14G, (A1-2) 5 parts by mass of A-BPE-10 and 38 parts by mass of KT50, (A2-1) 28 parts by mass of TMPT, and (A3) 1 part by mass of GMA and 5 parts by mass of TSL8370, (B) 0.085 parts by mass of FDG-007, (C) 1.0 part by mass of 2-(2-hydroxy-5-tert-octylphenyl)-2H-benzotriazole (UVA-1), 3.0 parts by mass of 2,4-dihydroxybenzophenone (UVA-3) as an ultraviolet absorber other than component (C), (D) 0.25 parts by mass of phenylbis(2,4,6-trimethylbenzoyl)-phosphineoxide (PI) as a polymerization initiator, and 0.1 parts by mass of L7001 as a leveling agent were added and sufficiently mixed to prepare a curable composition for an optical material.

Next, the composition as a mixed liquid was coated on an optical substrate and cured to obtain an optical material in which the optical substrate and the cured body were laminated. This will be described in detail below.

First, a thiourethane-based plastic lens (MR-8) having a center thickness of 2 mm and a refraction index of 1.60 was prepared as an optical substrate. This plastic lens was previously subjected to alkali etching at 50° C. for 5 minutes using a 10% sodium hydroxide solution, and then sufficiently washed with distilled water.

Using a spin coater (1H-DX2, manufactured by MIKASA Co., Ltd.), a moisture-curable primer (product name: TR-SC-P, manufactured by Tokuyama Corporation) was coated on the surface of the plastic lens at a rotation speed of 70 rpm for 15 seconds, and then at 1000 rpm for 10 seconds. Thereafter, about 2 g of the curable composition for an optical material obtained above was spin-coated at a rotation speed of 60 rpm for 40 seconds, and then 700 rpm for 10 to 20 seconds so as to be 40 μm thick.

The optical substrate with the curable composition for an optical material applied to its surface was cured by irradiating light for 40 seconds using a metal halide lamp with an output of 10 J/cm² in a nitrogen gas atmosphere. Thereafter, the mixture was further heated at 110° C. for 1 hour to produce an optical material in which an optical substrate and a cured body were laminated. The evaluation results are shown in Table 1.

Example 2

A curable composition for an optical material was obtained in the same manner as in Example 1 except that the component (C) was changed to 1.5 parts by mass of 2-(4,6-diphenyl-1,3,5-triazin-2-yl)-5-2-(2-ethylhexanoyloxy) phenol (UVA-2). Thereafter, in the same manner as in Example 1, an optical material in which an optical substrate and a cured body were laminated was produced, and the sample was evaluated. The evaluation results are shown in Table 1.

Example 3

A curable composition for an optical material was obtained in the same manner as in Example 1 except that the addition amount of the component (B) was changed to 0.024 parts by mass of FDG-007. Thereafter, in the same manner as in Example 1, an optical material in which an optical substrate and a cured body were laminated was produced, and the sample was evaluated. The evaluation results are shown in Table 1.

Example 4

A curable composition for an optical material was obtained in the same manner as in Example 1 except that the component (B) was changed to 0.15 parts by mass of FDG-006 and the component (C) was changed to 1.5 parts by mass of 2-(2-hydroxy-5-tert-octylphenyl)-2H-benzotriazole (UVA-1). Thereafter, in the same manner as in Example 1, an optical material in which an optical substrate and a cured body were laminated was produced, and the sample was evaluated. The evaluation results are shown in Table 1.

Example 5

A curable composition for an optical material was obtained in the same manner as in Example 1 except that the component (B) was changed to 0.085 parts by mass of FDG-005. Thereafter, in the same manner as in Example 1, an optical material in which an optical substrate and a cured body were laminated was produced, and the sample was evaluated. The evaluation results are shown in Table 1.

Example 6

To 100 parts by mass of monomer mixture (II) composed of (A1-1) 44 parts by mass of 14G, (A1-3) 10 parts by mass of A-PC, (A2-1) 39 parts by mass of TMPT, and (A3) 1 part by mass of GMA and 6 parts by mass of TSL8370, (B) 0.085 parts of FDG-007, (C) 1.0 part by mass of 2-(2-hydroxy-5-tert-octylphenyl)-2H-benzotriazole (UVA-1), 3.0 parts by mass of 2,4-dihydroxybenzophenone (UVA-3) as an ultraviolet absorber other than component (C), (D) 0.25 parts by mass of phenylbis(2,4,6-trimethylbenzoyl)-phosphineoxide (PI) as a polymerization initiator, and 0.1 parts by mass of L7001 as a leveling agent were added and sufficiently mixed to prepare a curable composition for an optical material. Thereafter, in the same manner as in Example 1, an optical material in which an optical substrate and a cured body were laminated was produced, and the sample was evaluated. The evaluation results are shown in Table 1.

Comparative Example 1

A curable composition for an optical material was obtained in the same manner as in Example 1 except that the (C) 2-(2-hydroxy-5-tert-octylphenyl)-2H-benzotriazole (UVA-1) was removed. Thereafter, in the same manner as in Example 1, an optical material in which an optical substrate and a cured body were laminated was produced, and the sample was evaluated. The evaluation results are shown in Table 1.

Comparative Example 2

A curable composition for an optical material was obtained in the same manner as in Example 1, except that the (C) 2-(2-hydroxy-5-tert-octylphenyl)-2H-benzotriazole (UVA-1) was removed and instead 1.0 part by mass of 2-hydroxy-4-octyloxybenzophenone (UVA-4) was added as an ultraviolet absorber other than component (C). Thereafter, in the same manner as in Example 1, an optical material in which an optical substrate and a cured body were laminated was produced, and the sample was evaluated. The evaluation results are shown in Table 1.

TABLE 1

| | Polymerizable monomer (A) | Tetraazaporphyrin (B) (part by mass) | Ultraviolet absorber (C) (part by mass) | Ultraviolet absorber other than (C) (part by mass) | Average transmittance (%) 580-600 nm | Average transmittance (%) 600-700 nm | Weather resistance residual rate (%) |
|---|---|---|---|---|---|---|---|
| Example 1 | Monomer mixture (I) | FDG-007 (0.085) | UVA-1 (1.0) | UVA-3 (3.0) | 40 | 84 | 97 |
| Example 2 | Monomer mixture (I) | FDG-007 (0.085) | UVA-2 (1.5) | UVA-3 (3.0) | 39 | 85 | 95 |
| Example 3 | Monomer mixture (I) | FDG-007 (0.024) | UVA-1 (1.0) | UVA-3 (3.0) | 67 | 88 | 99 |
| Example 4 | Monomer mixture (I) | FDG-006 (0.15) | UVA-1 (1.5) | UVA-3 (3.0) | 42 | 83 | 94 |
| Example 5 | Monomer mixture (I) | FDG-005 (0.085) | UVA-1 (1.0) | UVA-3 (3.0) | 50 | 87 | 95 |

TABLE 1-continued

| | Polymerizable monomer (A) | Tetraazaporphyrin (B) (part by mass) | Ultraviolet absorber (C) (part by mass) | Ultraviolet absorber other than (C) (part by mass) | Average transmittance (%) 580-600 nm | Average transmittance (%) 600-700 nm | Weather resistance residual rate (%) |
|---|---|---|---|---|---|---|---|
| Example 6 | Monomer mixture (II) | FDG-007 (0.085) | UVA-1 (1.0) | UVA-3 (3.0) | 38 | 84 | 95 |
| Comparative Example 1 | Monomer mixture (I) | FDG-007 (0.085) | — | UVA-3 (3.0) | 39 | 83 | 49 |
| Comparative Example 2 | Monomer mixture (I) | FDG-007 (0.085) | — | UVA-3 (3.0) UVA-4 (1.0) | 40 | 85 | 60 |

From the results of the above Examples and Comparative Examples, the following can be seen.

In Examples 1 to 6, the average transmittances from 580 to 600 nm and from 600 to 700 nm were low to a certain extent, and optical materials having good antiglare properties and excellent weather resistance were obtained. On the other hand, in the optical materials obtained in Comparative Examples 1 and 2, results were obtained in which the residual rate in the weather resistance test was low as compared with the optical materials obtained in Examples 1 to 6. From this, it is clear that when an ultraviolet absorber outside the scope of the present invention is used as the component (C), the weather resistance performance becomes insufficient.

The invention claimed is:

1. A curable composition for an optical material, comprising:
   (A) 100 parts by mass of a radical polymerizable monomer;
   (B) 0.005 to 0.5 parts by mass of a tetraazaporphyrin compound having a maximum absorption wavelength in a range of 560 nm or more and 620 nm or less;
   (C) 0.1 to 10 parts by mass of an ultraviolet absorber having a maximum absorption wavelength in a range of 330 nm or more and 350 nm or less; and
   (D) a photopolymerization initiator.

2. The curable composition for an optical material according to claim 1, wherein the tetraazaporphyrin compound (B) is a tetraazaporphyrin compound represented by the following formula (1):

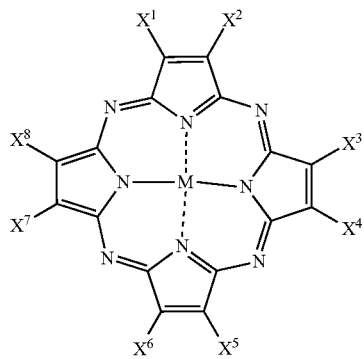

(1)

wherein, $X^1$ to $X^8$ each independently represent a hydrogen atom, a halogen atom, a nitro group, a cyano group, a hydroxy group, an amino group, a carboxy group, a sulfonic acid group, a linear, branched or cyclic alkyl group having 1 to 20 carbon atoms, a linear, branched or cyclic alkoxy group having 1 to 20 carbon atoms, an aryloxy group having 6 to 20 carbon atoms, a monoalkylamino group having 1 to 20 carbon atoms, a dialkylamino group having 2 to 20 carbon atoms, an aralkyl group having 7 to 20 carbon atoms, an aryl group having 6 to 20 carbon atoms, a heteroaryl group, an alkylthio group having 6 to 20 carbon atoms, or an arylthio group having 6 to 20 carbon atoms, and may form a ring excluding an aromatic ring via a linking group; and M represents two hydrogen atoms, a divalent metal atom, a divalent mono-substituted metal atom, a trivalent substituted metal atom, a tetravalent substituted metal atom, or a metal oxide atom.

3. A cured body obtained by curing the curable composition for an optical material according to claim 1.

4. An optical material obtained by laminating an optical substrate and the cured body according to claim 3.

5. The optical material according to claim 4, wherein the cured body has a thickness of 5 to 70 μm.

6. The optical material according to claim 5, wherein the difference between the average transmittance of the wavelength of 600 nm to 700 nm and the average transmittance of the wavelength of 580 nm to 600 nm is 10% or more.

7. The curable composition for an optical material according to claim 1, wherein the photopolymerization initiator comprises at least one selected from an acetophenone-based compound and an acylphosphine-based compound.

8. The curable composition for an optical material according to claim 1, wherein the ultraviolet absorber comprises at least one benzotriazole compound selected from 2-(2-hydroxy-5-methylphenyl)-2H-benzotriazole, 2-(3,5-di-tert-pentyl-2-hydroxyphenyl)-2H-benzotriazole, 2-(2H-benzotriazol-2-yl)-4-methyl-6-(3,4,5,6-tetrahydrophthalimidylmethyl)phenol, 2-(2-hydroxy-5-tert-octylphenyl)-2H-benzotriazole, 2-(2H-benzotriazol-2-yl)-4,6-bis(1-methyl-1-phenylethyl)phenol, 2,2'-methylenebis[6-(2H-benzotriazol-2-yl)-4-(1,1,3,3-tetramethylbutyl)phenol], and 2-(2H-benzotriazol-2-yl)-4-tert-butylphenol.

* * * * *